United States Patent
Xu (10) Patent No.: US 10,062,350 B2
(45) Date of Patent: Aug. 28, 2018

(54) VOLTAGE CONVERSION CIRCUIT, DISPLAY PANEL, AND METHOD FOR DRIVING THE DISPLAY PANEL

(71) Applicant: Shenzhen China Star Optoelectronics Technology Co., Ltd., Shenzhen, Guangdong (CN)

(72) Inventor: Hongyuan Xu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/778,300

(22) PCT Filed: Mar. 23, 2015

(86) PCT No.: PCT/CN2015/074894
§ 371 (c)(1),
(2) Date: Dec. 6, 2016

(87) PCT Pub. No.: WO2016/138681
PCT Pub. Date: Sep. 9, 2016

(65) Prior Publication Data
US 2017/0229087 A1    Aug. 10, 2017

(30) Foreign Application Priority Data
Mar. 5, 2015 (CN) .......................... 2015 1 0098114

(51) Int. Cl.
*G09G 5/00* (2006.01)
*G09G 3/36* (2006.01)

(52) U.S. Cl.
CPC ......... *G09G 3/3696* (2013.01); *G09G 3/3614* (2013.01); *G09G 3/3655* (2013.01); *G09G 2310/08* (2013.01); *G09G 2320/0247* (2013.01); *G09G 2330/02* (2013.01)

(58) Field of Classification Search
CPC .. G09G 3/3696; G09G 3/3614; G09G 3/3655; G09G 3/36; G09G 2310/08; G09G 2330/02; G09G 2320/0247
See application file for complete search history.

(56) References Cited

U.S. PATENT DOCUMENTS

| | | | | |
|---|---|---|---|---|
| 8,217,915 | B2 * | 7/2012 | Philipp | G06F 3/03547 345/174 |
| 8,643,626 | B2 * | 2/2014 | Philipp | G06F 3/03547 345/174 |
| 9,268,184 | B2 * | 2/2016 | Xu | G02F 1/136213 |
| 2013/0033527 | A1 * | 2/2013 | Yen | G09G 3/20 345/690 |
| 2015/0091859 | A1 * | 4/2015 | Rosenberg | G06F 3/044 345/174 |

* cited by examiner

Primary Examiner — Vijay Shankar
(74) Attorney, Agent, or Firm — Kim Winston LLP (57) ABSTRACT

Disclosed is a voltage conversion circuit, display panel, and method for driving the display panel. The voltage conversion circuit comprises: a voltage-dividing unit which receives a voltage of a data signal of a main pixel region, and divides the voltage of the data signal of the main pixel region so as to output an intermediate voltage, and a reverse unit which, under control of a first clock signal and a second clock signal, inversely converts the intermediate voltage to a voltage of the data signal of a sub pixel region, rendering polarity of a pixel voltage of the sub pixel region and polarity of a pixel voltage of the main pixel region opposite to each other.

13 Claims, 5 Drawing Sheets

VOLTAGE CONVERSION CIRCUIT, DISPLAY PANEL, AND METHOD FOR DRIVING THE DISPLAY PANEL

CROSS-REFERENCE TO RELATED APPLICATIONS

The present application claims benefit of Chinese patent application CN201510098114.9, entitled "Voltage conversion circuit, display panel, and method for driving the display panel" and filed on Mar. 5, 2015, the entirety of which is incorporated herein by reference.

TECHNICAL FIELD

The present disclosure relates to the technical field of liquid crystal displays, and in particular, to a voltage conversion circuit, a display panel, and a method for driving the display panel.

TECHNICAL BACKGROUND

In the existing technologies, liquid crystal display (LCD) devices are a type of commonly used flat-panel display device. In LCD devices, the light filed intensity of the backlight source is modulated through a liquid crystal switch, thereby achieving display of images. LCD devices have various display modes, among which is a commonly used vertical alignment (VA) display mode. VA display devices have excellent characteristics such as high contrast ratio and wide viewing angle, and do not need rubbing alignment. However, since VA display devices use vertically rotating liquid crystals, birefringences of liquid crystal molecules differ greatly, thereby leading to a serious color shift at a large viewing angle.

Currently, a main method for solving the problem of color shift of VA display devices is an eight-domain improving technology, i.e., to improve color shift by enabling the liquid crystal molecules in four domains (main pixel region) and in another four domains (sub pixel region) of a same sub pixel to have different rotating angles. Methods for improving color shift mainly are CC (capacitor/capacitor) technology, 2D1G (one sub pixel having one scan signal line and two data signal lines) technology, CS (charge sharing) technology, and Vcom voltage modulation technology, etc.

In most technologies for improving color shift, reversed polarities of liquid crystals in a main pixel region and in a sub pixel region are the same, and therefore, the main pixel region and the sub pixel region of a sub pixel are not able to display an image in a same frame through opposite polarities. Since absolute value of a pixel voltage of positive polarity and that of a pixel voltage of negative polarity are not completely symmetrical with respect to each other, each frame shows a periodical change in brightness which, in human vision, is flickers on the display panel, thereby rendering the display effect of the display panel inferior.

In 2D1G technology, one gate line drives a main pixel region and a sub pixel region simultaneously, and controls a voltage of a data signal of the main pixel region and a voltage of a data signal of the sub pixel region respectively, thus enabling rotating angles of liquid crystal molecules to be different, and thereby achieving an eight-domain display. Though 2D1G technology enables the main pixel region and the sub pixel region to display an image in a same frame through opposite polarities, quantity of data signal lines is doubled, which further doubles quantity of pins of a drive IC, thereby increasing the cost of chip on film (COF) packaging of panels. Besides, in order to drive the main pixel region and the sub pixel region simultaneously, structure of the drive IC will be more complex, which will also increase the manufacturing cost.

Therefore, it is desired that a display panel be provided to alleviate the color shift in VA display mode, and in the meanwhile, to reduce flickers on the display panel.

SUMMARY OF THE INVENTION

The objective of the present disclosure is to solve the technical problem that in the existing technologies, there are serious flickers on vertical alignment (VA) display panels.

The present disclosure provides a voltage conversion circuit which comprises: a voltage-dividing unit which receives a voltage of a data signal of a main pixel region, and divides the voltage of the data signal of the main pixel region so as to output an intermediate voltage, the intermediate voltage having a value between the voltage of the data signal of the main pixel region and a common voltage; and a reverse unit, which, under control of a first clock signal and a second clock signal, reversely converts the intermediate voltage to a voltage of a data signal of a sub pixel region, rendering polarity of a pixel voltage of the sub pixel region and polarity of a pixel voltage of the main pixel region opposite to each other.

In one embodiment, the voltage-dividing unit comprises a first voltage-dividing capacitor and a second voltage-dividing capacitor which are in series connection. An input end of the first voltage-dividing capacitor is connected to a main data line, for receiving the voltage of the data signal of the main pixel region. An input end of the second voltage-dividing capacitor is connected to a common electrode, for receiving the common voltage. And a connecting end of the first voltage-dividing capacitor and that of the second voltage-dividing capacitor serve as an output end of the voltage-dividing unit, for outputting the intermediate voltage.

In one embodiment, the reverse unit comprises a holding capacitor, a sampling voltage switch, an initializing switch, a reference voltage switch, and an output voltage switch. The sampling voltage switch and the initializing switch are both switched on under control of the first clock signal. The sampling voltage switch imposes the intermediate voltage on a first electrode of the holding capacitor, and the initializing switch imposes the common voltage on a second electrode of the holding capacitor, causing an initial potential difference between the first electrode and the second electrode of the holding capacitor. The initial potential difference is a difference between the intermediate voltage and the common voltage. The reference voltage switch and the output voltage switch are both switched on under control of the second clock signal. The reference voltage switch imposes the common voltage on the first electrode of the holding capacitor, and the second electrode of the holding capacitor generates the voltage of the data signal of the sub pixel region which is transmitted to the sub pixel region through the output voltage switch.

In one embodiment, a difference between the common voltage and the voltage of the data signal of the sub pixel region equals the initial potential difference.

In one embodiment, an input end of the sampling voltage switch is connected to an output end of the voltage-dividing unit, and an output end of the sampling voltage switch is connected to the first electrode of the holding capacitor. An input end of the initializing switch is connected to the common electrode, and an output end of the initializing switch is connected to the second electrode of the holding capacitor. And controlling ends of the sampling voltage switch and the initializing switch are connected to a first clock source, for receiving a first clock signal.

In one embodiment, an input end of the reference voltage switch is connected to the common electrode, and an output end of the reference voltage switch is connected to the first electrode of the holding capacitor. An input end of the output voltage switch is connected to the second electrode of the holding capacitor, and an output end of the output voltage switch is connected to a sub data line. And controlling ends of the reference voltage switch and the output voltage switch are connected to a second clock source, for receiving a second clock signal.

In one embodiment, a first clock signal pulse is provided after the data signal of the main pixel region arrives, and a second clock signal pulse is provided after the first clock signal pulse ends and before a scan drive signal arrives.

According to another aspect of the present disclosure, a liquid crystal display panel is provided. The liquid crystal display panel comprises a display area and a non-display area. The display area comprises: a gate line for transmitting a scan drive signal; a main data line for transmitting a data signal of a main pixel region; a sub data line for transmitting a data signal of a sub pixel region; a main pixel region which displays an image according to the scan drive signal and the data signal of the main pixel region; and a sub pixel region which displays an image according to the scan drive signal and the data signal of the sub pixel region. The non-display area is located on the periphery of the display area, and comprises the above voltage conversion circuit. An input end of the voltage conversion circuit is connected to the main data line, and an output end of the voltage conversion circuit is connected to the sub data line.

According to another aspect of the present disclosure, a method for driving the liquid crystal display panel is provided. The method comprises steps of: supplying a data signal of a main pixel region to a main data line; dividing a voltage of the data signal of the main pixel region so as to obtain an intermediate voltage; under control of a first clock signal and a second clock signal, reversely converting the intermediate voltage to a voltage of a data signal of a sub pixel region, and transmitting the voltage of the data signal of the sub pixel region to a sub data line; and supplying a scan drive signal to the main pixel region and the sub pixel region, enabling the main pixel region to display an image according to the data signal of the main pixel region, and enabling the sub pixel region to display an image according to the data signal of the sub pixel region.

In one embodiment, the step of reversely converting the intermediate voltage comprises steps of: under control of the first clock signal, imposing the intermediate voltage on a first electrode of the holding capacitor, and imposing the common voltage on a second electrode of the holding capacitor, thereby causing an initial potential difference between the first electrode and the second electrode of the holding capacitor; and under control of the second clock signal, imposing the common voltage on the first electrode of the holding capacitor, causing the second electrode of the holding capacitor to generate the voltage of the data signal of the sub pixel region, wherein a difference between the common voltage and the voltage of the data signal of the sub pixel region equals the initial potential difference.

According to the present disclosure, the following beneficial effects can be achieved. Polarities of the pixel voltages of the main pixel region and the sub pixel region are opposite to each other, and the absolute value of the pixel voltage of the sub pixel region is smaller than that of the pixel voltage of the main pixel region. Rotating angles of liquid crystal molecules in the main pixel region and in the sub pixel region are different, and in a same frame, the main pixel region and the sub pixel region display images through opposite polarities. Therefore, in one frame, brightness of pixels of different polarities can be distributed evenly in space, thereby rendering it difficult to see flickers on the entire image. Thus, when color shift in VA display mode is alleviated, the display quality of the display panel is also improved.

Other features and advantages of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

The accompanying drawings are provided for further understanding the present disclosure together with the embodiments, and constitute a part of the description, and are not intended to limit the present disclosure.

DETAILED DESCRIPTION OF THE EMBODIMENTS

A more detailed description will be given below for further illustrating the objective, the technical solutions, and the advantages of the present disclosure.

The embodiments of the present disclosure provide a voltage conversion circuit for a vertical alignment (VA) display panel. The voltage conversion circuit is provided in a non-display area of the display panel, and is used to divide and reversely convert a voltage of a data signal supplied to a main pixel region so as to obtain a data signal of a sub pixel region, thereby rendering polarity of a pixel voltage of the sub pixel region and polarity of a pixel voltage of the main pixel region opposite to each other, and rendering absolute value of the pixel voltage of the sub pixel region smaller than that of the pixel voltage of the main pixel region. Thus, rotating angles of liquid crystal molecules in the main pixel region and in the sub pixel region will be different from each other, and in a same frame, the main pixel region and the sub pixel region will be able to display images through opposite polarities. In this case, in one frame, brightness of pixels of different polarities can be distributed evenly in space, thereby rendering it difficult to see flickers on the entire image.

Embodiment 1

Figure 1:
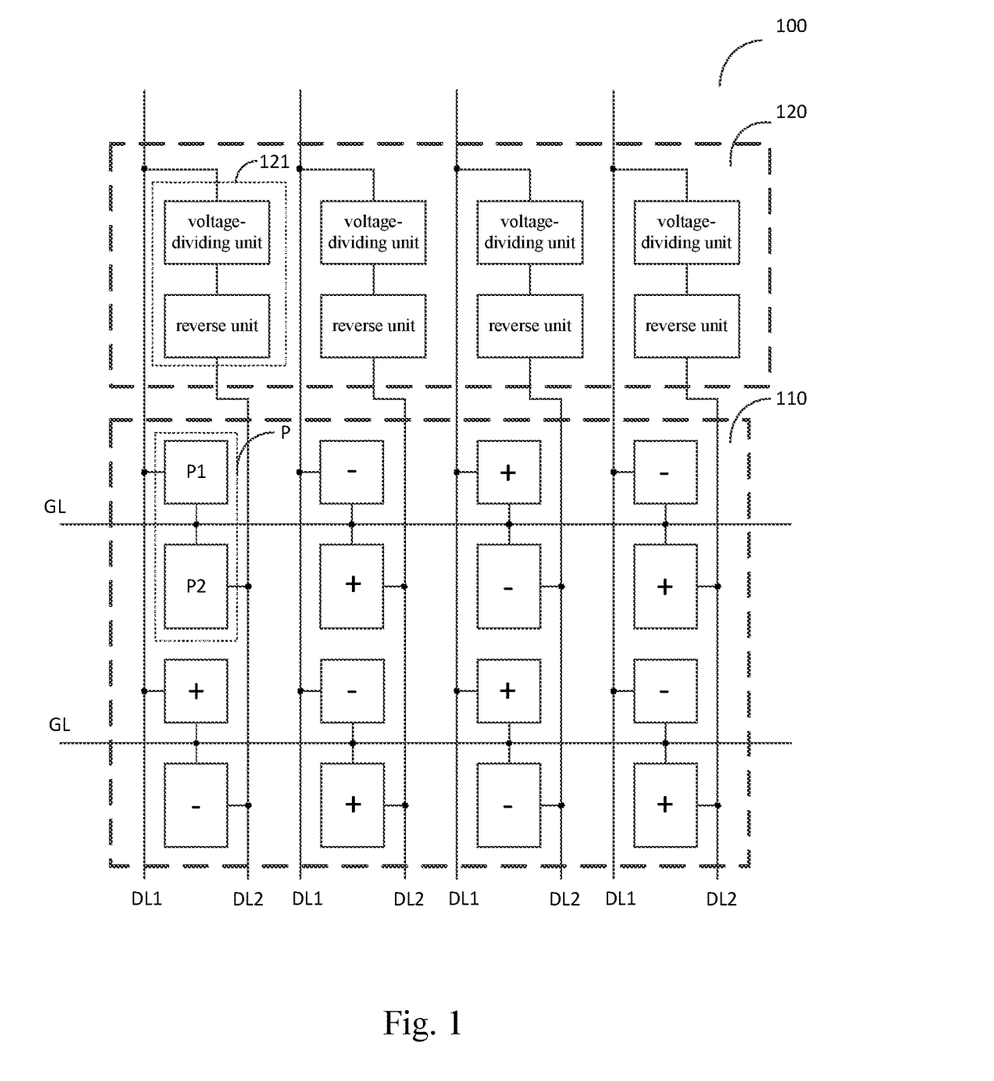
FIG. 1 schematically shows the structure of a display panel according to embodiment 1 of the present disclosure.

FIG. 1 schematically shows structure of a liquid crystal display panel according to the present embodiment. The display panel 100 is, for example, a vertical alignment (VA) display panel which comprises a display area 110 and a non-display area 120, wherein the non-display area 120 is located on the periphery of the display area 110. Gate lines GL and data lines DL are formed on the display panel 100 along a first direction and a second direction, respectively, and cross with each other in the display area 110. The data lines DL include a main data line DL1 and a sub data line DL2 which are parallel to each other and are arranged alternatively. The gate lines GL are used to transmit a scan drive signal. The main data line DL1 is used to transmit a data signal of a main pixel region, and the sub data line DL2 is used to transmit a data signal of a sub pixel region.

The display area 110 is provided therein with a plurality of pixel regions P. Each pixel region P is connected to a gate line GL, and a pair of data lines, namely DL1 and DL2. The pixel regions P each are divided into a main pixel region P1 and a sub pixel region P2. As shown in FIG. 1, the main pixel region P1 and the sub pixel region P2 are connected both to the gate line GL, so as to receive the scan drive signal simultaneously. The main pixel region P1 is connected to the main data line DL1, so as to receive the data signal of the main pixel region, and displays an image according to the scan drive signal and the data signal of the main pixel region. The sub pixel region P2 is connected to the main data line DL2, so as to receive the data signal of the sub pixel region, and displays an image according to the scan drive signal and the data signal of the sub pixel region.

The main data line DL1 and the sub data Line DL2 extend to the non-display area 120 where a voltage conversion circuit 121 is formed therein. An input end of the voltage conversion circuit 121 is connected to the main data line DL1, and an output end of the voltage conversion circuit 121 is connected to the sub data Line DL2, so that variation of a pixel voltage of the sub pixel region can be correlated to variation of a pixel voltage of the main pixel region. Specifically, the voltage conversion circuit 121 comprises a voltage-dividing unit and a reverse unit. The voltage-dividing unit receives the voltage of the data signal of the main pixel region from the main data line DL1, and divides the voltage of the data signal of the main pixel region so as to output an intermediate voltage. The intermediate voltage has a value between the voltage of the data signal of the main pixel region and a common voltage. The reverse unit, under control of a first clock signal and a second clock signal, reversely converts the intermediate voltage to obtain the voltage of the data signal of the sub pixel region, and transmits the voltage of the data signal of the sub pixel region to the sub data line DL2, rendering polarity of the pixel voltage of the sub pixel region and polarity of the pixel voltage of the main pixel region opposite to each other.

Figure 2:
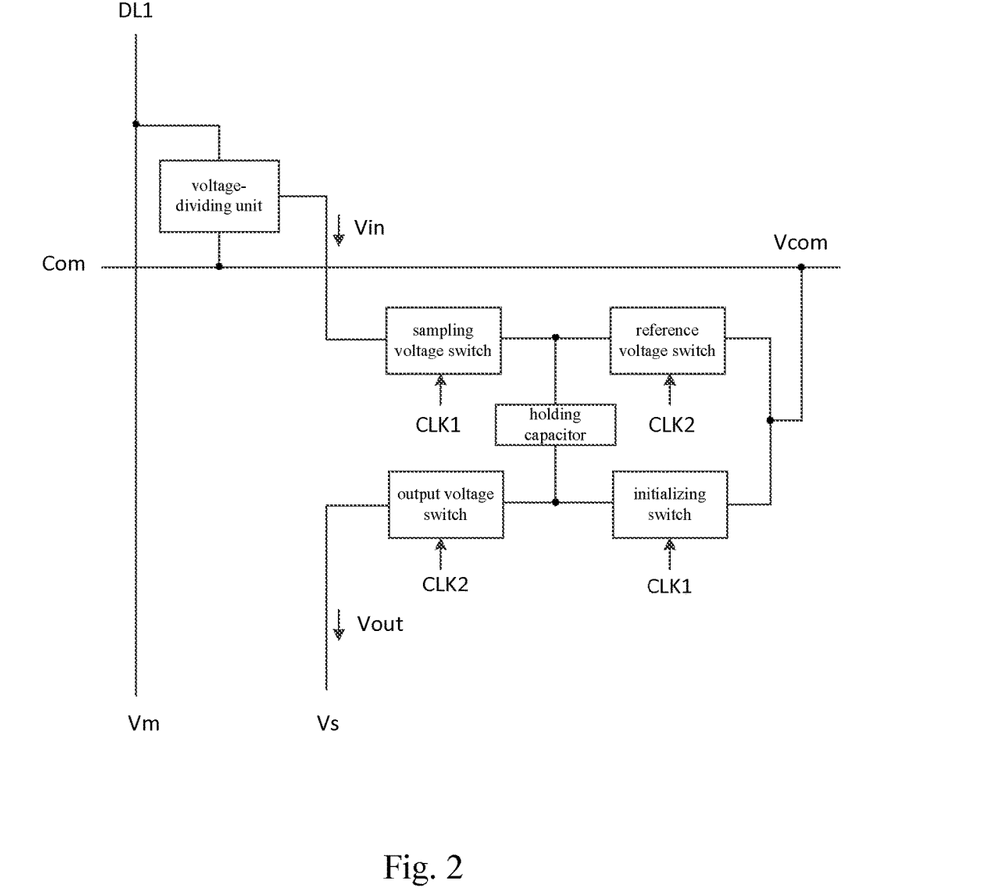
FIG. 2 schematically shows the structure of a voltage conversion circuit according to embodiment 1 of the present disclosure.

A detailed description will be provided below on structure of the voltage conversion circuit 121 with reference to FIG. 2. As shown in FIG. 2, a first input end of the voltage-dividing unit is connected to the main data line DL1, for receiving the voltage Vm of the data signal of the main pixel region, and a second input end of the voltage-dividing unit is connected to the common electrode, for receiving a common voltage. The voltage-dividing unit generates the intermediate voltage Vin based on the voltage of the data signal of the main pixel region and the common voltage, and outputs the intermediate voltage Vin from the output end thereof.

As shown in FIG. 2, the reverse unit comprises a holding capacitor, a sampling voltage switch, an initializing switch, a reference voltage switch, and an output voltage switch. An input end of the sampling voltage switch is connected to an output end of the voltage-dividing unit, and an output end of the sampling voltage switch is connected to a first electrode of the holding capacitor. An input end of the initializing switch is connected to the common electrode, and an output end of the initializing switch is connected to a second electrode of the holding capacitor. Controlling ends of the sampling voltage switch and the initializing switch are both connected to a first clock source, for receiving a first clock signal CLK1.

The sampling voltage switch and the initializing switch are both switched on under control of the first clock signal. The sampling voltage switch imposes the intermediate voltage on the first electrode of the holding capacitor, and the initializing switch imposes the common voltage on the second electrode of the holding capacitor, thereby causing an initial potential difference between the first electrode and the second electrode of the holding capacitor. The initial potential difference is a difference between the intermediate voltage and the common voltage.

An input end of the reference voltage switch is connected to the common electrode, and an output end of the reference voltage switch is connected to the first electrode of the holding capacitor. An input end of the output voltage switch is connected to the second electrode of the holding capacitor, and an output end of the output voltage switch is connected to a sub data line. Controlling ends of the reference voltage switch and the output voltage switch are connected both to a second clock source, for receiving a second clock signal CLK2.

The reference voltage switch and the output voltage switch are both switched on under control of the second clock signal. The reference voltage switch imposes the common voltage on the first electrode of the holding capacitor, causing the second electrode of the holding capacitor to generate the voltage Vs of the data signal of the sub pixel region, which is transmitted to the sub data line through the output voltage switch.

In the present embodiment, the two electrodes of the holding capacitor have a same polarity, and are referred to as the first electrode and the second electrode only for the sake of easy illustration. In the present embodiment, the electrode of the holding capacitor which is connected to the sampling voltage switch is referred to as the first electrode, and the other electrode is referred to as the second electrode.

Figure 3:
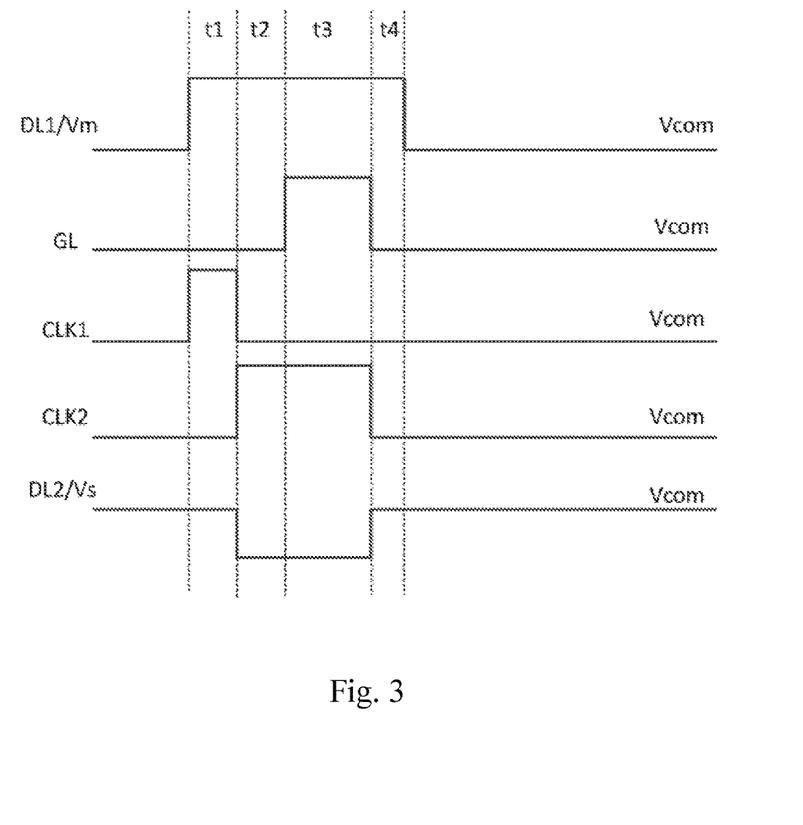
FIG. 3 shows a diagram of a time sequence of signals according to embodiment 1 of the present disclosure.

FIG. 3 shows a time sequence of a data drive signal, the scan drive signal, the first clock signal CLK1, and the second clock signal CLK2. Thus, after arrival of the scan drive signal, the main pixel region displays an image according to the voltage Vm of the data signal received from the main data line DL1, and the sub pixel region displays an image according to the voltage Vs of the data signal received from the sub data line DL2.

Embodiment 2

Figure 4:
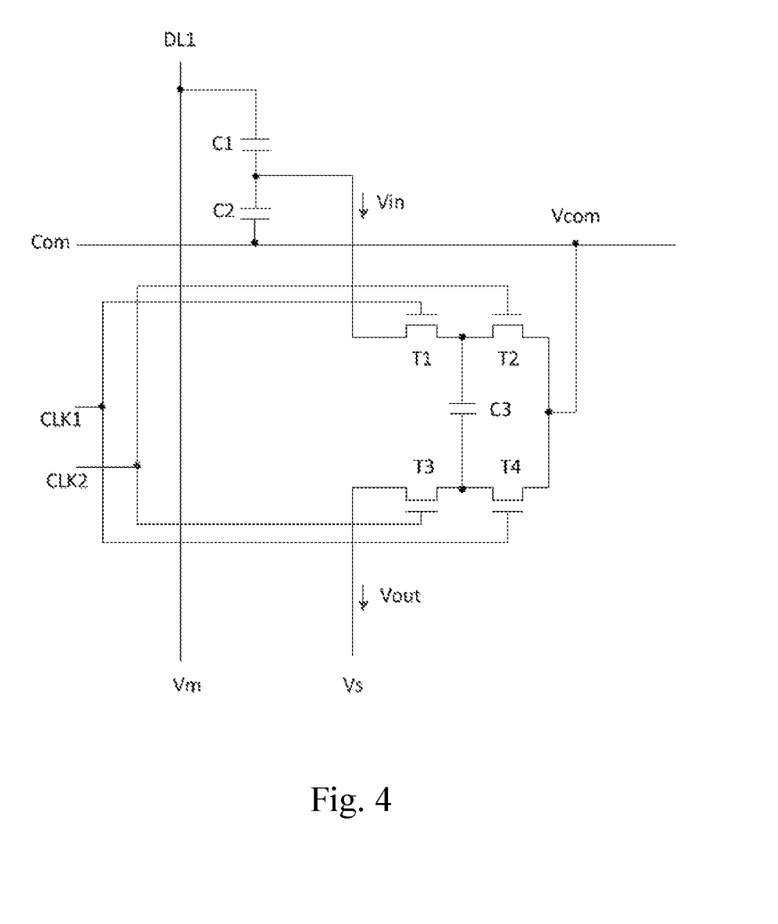
FIG. 4 schematically shows the structure of a voltage conversion circuit according to embodiment 2 of the present disclosure.

The present embodiment provides a specific structure of a voltage reversal circuit. As shown in FIG. 4, the reverse unit comprises four transistors T1, T2, T3, and T4 of a same channel type, and a capacitor C3.

The transistor T1 serves as a specific example of the sampling voltage switch; the transistor T2 serves as a specific example of the reference voltage switch; the transistor T3 serves as a specific example of the output voltage switch; and the transistor T4 serves as a specific example of the initializing switch. The four transistors T1, T2, T3, and T4 can each be, for example, n-type thin film transistors (TFT).

In the present embodiment, the voltage-dividing unit comprises two capacitors C1 and C2 which are in series connection. An input end of the first voltage-dividing capacitor C1 is connected to the main data line DL1, for receiving the voltage Vm of the data signal of the main pixel region. An input end of the second voltage-dividing capacitor C2 is connected to the common electrode, for receiving a common voltage Vcom. A connecting end of the capacitors C1 and C2 serves as the output end of the voltage-dividing unit, for outputting the intermediate voltage Vin. Therefore, the relationship between the intermediate voltage Vin and the voltage Vm of the data signal of the main pixel region can be expressed as: Vin=(C1/(C1+C2))*(Vmain−Vcom)+Vcom. The voltage difference between Vin and Vcom is smaller than that between Vm and Vcom, and value of the intermediate voltage Vin can be regulated by setting capacitances of the capacitors C1 and C2. In the process of manufacturing display panels, the capacitances can be regulated by setting areas of the capacitors C1 and C2.

For multi-domain VA display panels, difference types of liquid crystal display devices (e.g., tablet PCs, cell phones, or liquid crystal display devices) have different requirements for pixel voltages of the main pixel region and the sub pixel region. In the present embodiment, the capacitors C1 and C2 in series connection divide the voltage, and can flexibly set the value of the intermediate voltage Vin, and thus can freely control a difference of pixel voltage between the main pixel region and the sub pixel region, thereby effectively alleviating the color shift caused by a change of viewing angle.

A detailed description will be provided below on structure of the reverse unit according to the present embodiment with reference to FIG. 4.

Gates of T1 and T4 are both connected to a first clock source so as to receive a first clock signal CLK1. A source of T1 is coupled to the output end of the voltage-dividing unit, for receiving the intermediate voltage Vin. A drain of T1 is coupled to a first electrode of a holding capacitor C3. A source of T4 is coupled to the common electrode, for receiving the common voltage Vcom. A drain of T4 is coupled to a second electrode of the holding capacitor C3.

Gates of T2 and T3 are both connected to a second clock source so as to receive a first clock signal CLK2. A source of T2 is coupled to the common electrode, for receiving the common voltage Vcom. A drain of T2 is coupled to the first electrode of the holding capacitor C3. A source of T3 is coupled to the second electrode of the holding capacitor C3. A drain of T3 is coupled to the sub data line DL2, for outputting voltage Vout.

A description will be provided below on a method for driving the display panel according to the present embodiment with reference to the diagram of the time sequence of signals as shown in FIG. 3.

During time period t1, the data signal of the main pixel region is supplied to the main data line DL1. The voltage of the data signal on the main data line DL1 jumps from a low level to a high level. The voltage-dividing unit divides the voltage of the data signal of the main pixel region, thus obtaining the intermediate voltage Vin.

The first clock signal CLK1 jumps from a low level to a high level, and T1 and T4 are switched on. When T1 is switched on, the intermediate voltage Vin is imposed on the first electrode of the holding capacitor C3, and when T4 is switched on, the common voltage Vcom is imposed on the second electrode of the holding capacitor C3, causing an initial potential difference ΔV between the first electrode and the second electrode of the holding capacitor C3, wherein ΔV=Vin−Vcom.

During time period t2, the first clock signal CLK1 jumps from a high level to a low level, and T1 and T4 are switched off. The second clock signal CLK2 jumps from a low level to a high level, and T2 and T3 are switched on. When T2 is switched on, the common voltage Vcom is imposed on the first electrode of the holding capacitor C3. Since the voltage on the first electrode of the holding capacitor C3 is changed from Vin into Vcom, and the initial potential difference ΔV between the two electrodes of the holding capacitor C3 is kept constant, an output voltage generated on the second electrode of the holding capacitor C3 is Vout=Vcom−ΔV. The output voltage Vout, as the voltage Vs of the data signal of the sub pixel region, is output to the sub data line DL2 through the drain of T3.

In other words, when the Vin is a potential of positive polarity being ΔV higher than a potential of the Vcom, the Vout is a potential of negative polarity being ΔV lower than the potential of the Vcom. When the Vin is a potential of negative polarity being ΔV lower than the potential of the Vcom, the Vout is a potential of positive polarity being ΔV higher than the potential of the Vcom.

In this case, under control of the first clock signal CLK1 and the second clock signal CLK2, the intermediate voltage is converted reversely to obtain the voltage Vs of the data signal of the sub pixel region which is then transmitted to the sub data line DL2, thereby achieving a polarity reversal between the pixel voltage Vm of the main pixel region and the pixel voltage Vs of the sub pixel region.

During time period t3, the scan drive signal is supplied to the main pixel region and the sub pixel region. A voltage of the scan signal on the gate line GL jumps from a low level to a high level. The second clock signal CLK2 is kept at a high level, and T2 and T3 are switched on. Thus, the main pixel region displays an image according to the voltage Vm of the data signal of the main pixel region, and the sub pixel region displays an image according to the voltage Vs of the data signal of the sub pixel region.

It should be emphasized that, the voltage-dividing unit renders the voltage difference (initial potential difference ΔV) between the Vin and the Vcom smaller than the voltage difference between the Vm and the Vcom, and the reverse unit renders the voltage difference between the Vcom and the Vs equal to the initial potential difference ΔV, and therefore, |Vs−Vcom|<|Vm−Vcom|. That is, the absolute value of the pixel voltage of the sub pixel region is smaller than that of the pixel voltage of the main pixel region, thus achieving image display of an eight-domain VA display panel.

During time period t4, the voltage of the scan signal on the gate line GL jumps from a high level to a low level. The second clock signal CLK2 jumps from a high level to a low level. However, the voltage of the data signal on the main data line DL1 is kept at a high level. Since CLK2 jumps to a low level, T2 and T3 are switched off. Further, since the voltage of the scan signal on the gate line GL jumps to a low level, the main pixel region and the sub pixel region stop receiving the voltage of the data signal.

Up till now, image display by a row of pixel units is finished during the time period from t1 to t4.

As shown in FIG. 3, in each frame period, the scan drive signal lags a predetermined time period (t1+t2) behind the data signal of the main pixel region. In this predetermined time period, the voltage reversal circuit performs the operations of dividing the voltage Vm of the data signal of the main pixel region and the reversal of polarities, thus obtaining the voltage Vs of the data signal of the sub pixel region. After the arrival of the data signal of the main pixel region, a first clock signal pulse CLK1 is provided. During an effective time period for CLK1, namely time period t1, the intermediate voltage Vin is sampled, and the holding capacitor C3 is charged to have an initial potential difference ΔV. After the first clock signal pulse CLK1 ends and before the scan drive signal arrives, a second clock signal pulse CLK2 is provided. During an effective time period for CLK2, namely time period t2, the intermediate voltage Vin is reversely converted.

Considering that a feedthrough voltage exists in the display panel in operation, and will cause the pixel voltages of positive and negative polarities to be not completely symmetrical to the common voltage, the present embodiment is especially applicable to display panels with small feedthrough voltage, for example, LTPS panels of a top gate structure.

Embodiment 3

Figure 5:
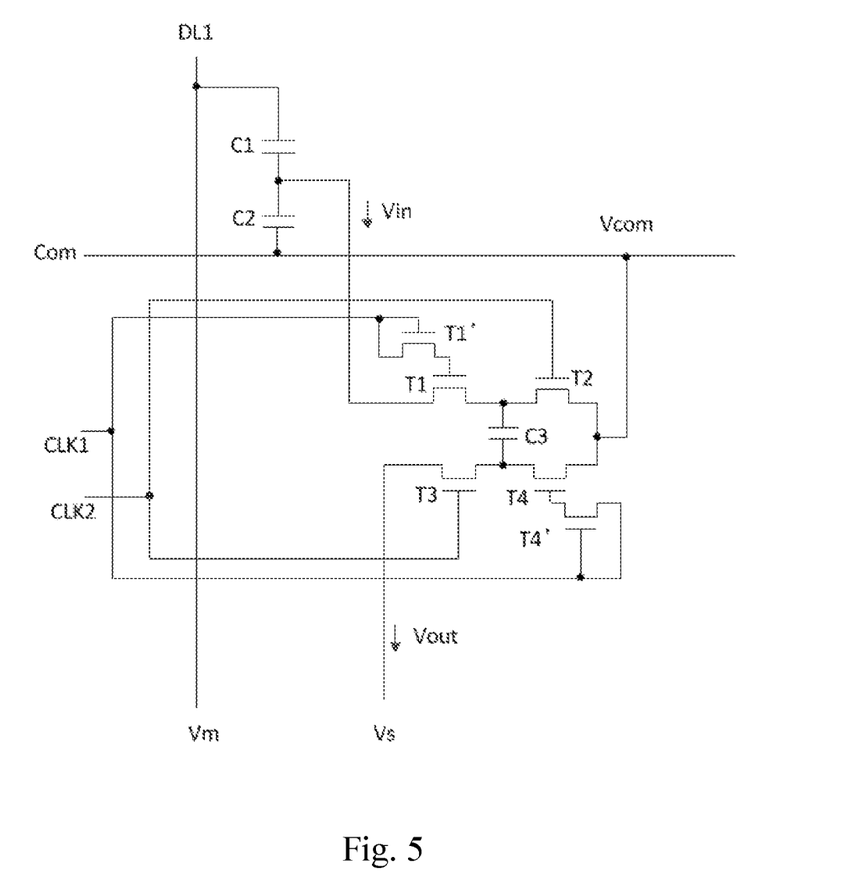
FIG. 5 schematically shows the structure of a voltage conversion circuit according to embodiment 3 of the present disclosure.

Different from embodiment 2, in the present embodiment two transistors T1' and T4' are added to the sampling voltage switch and the initializing switch. As shown in FIG. 5, a gate and a source of T1' are short-circuited, and are coupled to a first clock source, for receiving a first clock signal CLK1. A drain of T1' is coupled with the gate of T1'. A gate and a source of T4' are short-circuited, and are coupled to the first clock source, for receiving the first clock signal CLK1. A drain of T4' is coupled with the gate of T4'.

The transistors T1' and T4' enable the reverse unit to work more steadily. Specifically, during time period t1, when the first clock signal CLK1 jumps from a low level to a high level, the sampling voltage switch and the initializing switch can be switched on quickly, and when the first clock signal CLK1 jumps from a high level to a low level, the sampling voltage switch and the initializing switch can be switched off quickly.

Anyone skilled in the art should understand that the reference voltage switch and the output voltage switch can adopt a similar structure, which will not be described herein in detail.

The above embodiments are described only for better understanding, rather than restricting the present disclosure. Anyone skilled in the art can make amendments to the implementing forms or details without departing from the spirit and scope of the present disclosure. The scope of the present disclosure should still be subject to the scope defined in the claims.

The invention claimed is:

1. A liquid crystal display panel, comprising a display area and a non-display area,
    wherein the display area comprises:
    a gate line, for transmitting a scan drive signal,
    a main data line, for transmitting a data signal of a main pixel region,
    a sub data line, for transmitting a data signal of a sub pixel region,
    a main pixel region, which displays an image according to the scan drive signal and the data signal of the main pixel region, and
    a sub pixel region, which displays an image according to the scan drive signal and the data signal of the sub pixel region,
    wherein the non-display area is located on the periphery of the display area, and comprises a voltage conversion circuit, and
    wherein the voltage conversion circuit comprises:
    a voltage-dividing unit, which receives a voltage of the data signal of the main pixel region, and divides the voltage of the data signal of the main pixel region so as to output an intermediate voltage, the intermediate voltage having a value between the voltage of the data signal of the main pixel region and a common voltage, and
    a reverse unit, which, under control of a first clock signal and a second clock signal, reversely converts the intermediate voltage to a voltage of the data signal of the sub pixel region, rendering polarity of a pixel voltage of the sub pixel region and polarity of a pixel voltage of the main pixel region opposite to each other,
    an input end of the voltage conversion circuit is connected to the main data line, and an output end of the voltage conversion circuit is connected to the sub data line;
    wherein the reverse unit comprises a holding capacitor, a sampling voltage switch, an initializing switch, a reference voltage switch, and an output voltage switch, and
    wherein the sampling voltage switch and the initializing switch are both switched on under control of the first clock signal, the sampling voltage switch imposing the intermediate voltage on a first electrode of the holding capacitor, and the initializing switch imposing the common voltage on a second electrode of the holding capacitor, causing an initial potential difference between the first electrode and the second electrode of the holding capacitor, the initial potential difference being a difference between the intermediate voltage and the common voltage, and
    the reference voltage switch and the output voltage switch are both switched on under control of the second clock signal, the reference voltage switch imposing the common voltage on the first electrode of the holding capacitor, and the second electrode of the holding capacitor generating the voltage of the data signal of the sub pixel region which is transmitted to the sub pixel region through the output voltage switch.

2. The liquid crystal display panel according to claim 1, wherein the voltage-dividing unit comprises a first voltage-dividing capacitor and a second voltage-dividing capacitor which are in series connection, and
    wherein an input end of the first voltage-dividing capacitor is connected to the main data line, for receiving the voltage of the data signal of the main pixel region,
    an input end of the second voltage-dividing capacitor is connected to a common electrode, for receiving the common voltage, and
    a connecting end of the first voltage-dividing capacitor and that of the second voltage-dividing capacitor serve as an output end of the voltage-dividing unit, for outputting the intermediate voltage.

3. The liquid crystal display panel according to claim 1, wherein a difference between the common voltage and the voltage of the data signal of the sub pixel region equals the initial potential difference.

4. The liquid crystal display panel according to claim 1, wherein
    an input end of the sampling voltage switch is connected to an output end of the voltage-dividing unit, and an output end of the sampling voltage switch is connected to the first electrode of the holding capacitor,
    an input end of the initializing switch is connected to the common electrode, and an output end of the initializing switch is connected to the second electrode of the holding capacitor, and controlling ends of the sampling voltage switch and the initializing switch are connected to a first clock source, for receiving a first clock signal.

5. The liquid crystal display panel according to claim 1, wherein
an input end of the reference voltage switch is connected to the common electrode, and an output end of the reference voltage switch is connected to the first electrode of the holding capacitor,
an input end of the output voltage switch is connected to the second electrode of the holding capacitor, and an output end of the output voltage switch is connected to the sub data line, and
controlling ends of the reference voltage switch and the output voltage switch are connected to a second clock source, for receiving a second clock signal.

6. The liquid crystal display panel according to claim 1, wherein a first clock signal pulse is supplied after the data signal of the main pixel region arrives, and a second clock signal pulse is supplied after the first clock signal pulse ends and before the scan drive signal arrives.

7. A method for driving a liquid crystal display panel, comprising steps of:
supplying a data signal of a main pixel region to a main data line,
dividing a voltage of the data signal of the main pixel region, obtaining an intermediate voltage,
under control of a first clock signal and a second clock signal, reversely converting the intermediate voltage to a voltage of a data signal of a sub pixel region, and transmitting the voltage of the data signal of the sub pixel region to a sub data line, and
supplying a scan drive signal to the main pixel region and the sub pixel region, enabling the main pixel region to display an image according to the data signal of the main pixel region, and enabling the sub pixel region to display an image according to the data signal of the sub pixel region;
wherein the step of reversely converting the intermediate voltage comprises:
under control of the first clock signal, imposing the intermediate voltage on a first electrode of a holding capacitor, and imposing a common voltage on a second electrode of the holding capacitor, thereby causing an initial potential difference between the first electrode and the second electrode of the holding capacitor, and
under control of the second clock signal, imposing the common voltage on the first electrode of the holding capacitor, causing the second electrode of the holding capacitor to generate the voltage of the data signal of the sub pixel region, a difference between the common voltage and the voltage of the data signal of the sub pixel region being equal to the initial potential difference.

8. A voltage conversion circuit, comprising:
a voltage-dividing unit, which receives a voltage of a data signal of a main pixel region, and divides the voltage of the data signal of the main pixel region so as to output an intermediate voltage, the intermediate voltage having a value between the voltage of the data signal of the main pixel region and a common voltage, and
a reverse unit, which, under control of a first clock signal and a second clock signal, reversely converts the intermediate voltage to a voltage of a data signal of a sub pixel region, rendering polarity of a pixel voltage of the sub pixel region and polarity of a pixel voltage of the main pixel region opposite to each other;

wherein the reverse unit comprises a holding capacitor, a sampling voltage switch, an initializing switch, a reference voltage switch, and an output voltage switch, and
wherein the sampling voltage switch and the initializing switch are both switched on under control of the first clock signal, the sampling voltage switch imposing the intermediate voltage on a first electrode of the holding capacitor, and the initializing switch imposing the common voltage on a second electrode of the holding capacitor, causing an initial potential difference between the first electrode and the second electrode of the holding capacitor, the initial potential difference being a difference between the intermediate voltage and the common voltage, and
the reference voltage switch and the output voltage switch are both switched on under control of the second clock signal, the reference voltage switch imposing the common voltage on the first electrode of the holding capacitor, and the second electrode of the holding capacitor generating the voltage of the data signal of the sub pixel region which is transmitted to the sub pixel region through the output voltage switch.

9. The voltage conversion circuit according to claim 1, wherein the voltage-dividing unit comprises a first voltage-dividing capacitor and a second voltage-dividing capacitor which are in series connection, and
wherein an input end of the first voltage-dividing capacitor is connected to a main data line, for receiving the voltage of the data signal of the main pixel region,
an input end of the second voltage-dividing capacitor is connected to a common electrode, for receiving the common voltage, and
a connecting end of the first voltage-dividing capacitor and that of the second voltage-dividing capacitor serve as an output end of the voltage-dividing unit, for outputting the intermediate voltage.

10. The voltage conversion circuit according to claim 1, wherein a difference between the common voltage and the voltage of the data signal of the sub pixel region equals the initial potential difference.

11. The voltage conversion circuit according to claim 1, wherein
an input end of the sampling voltage switch is connected to an output end of the voltage-dividing unit, and an output end of the sampling voltage switch is connected to the first electrode of the holding capacitor,
an input end of the initializing switch is connected to the common electrode, and an output end of the initializing switch is connected to the second electrode of the holding capacitor, and
controlling ends of the sampling voltage switch and the initializing switch are connected to a first clock source, for receiving a first clock signal.

12. The voltage conversion circuit according to claim 1, wherein
an input end of the reference voltage switch is connected to the common electrode, and an output end of the reference voltage switch is connected to the first electrode of the holding capacitor,
an input end of the output voltage switch is connected to the second electrode of the holding capacitor, and an output end of the output voltage switch is connected to a sub data line, and
controlling ends of the reference voltage switch and the output voltage switch are connected to a second clock source, for receiving a second clock signal.

13. The voltage conversion circuit according to claim 1, wherein a first clock signal pulse is supplied after the data signal of the main pixel region arrives, and a second clock signal pulse is supplied after the first clock signal pulse ends and before a scan drive signal arrives.

* * * * *